Oct. 17, 1939.　　　G. G. MORIN ET AL　　　2,176,468
CLUTCH MECHANISM
Filed April 27, 1937
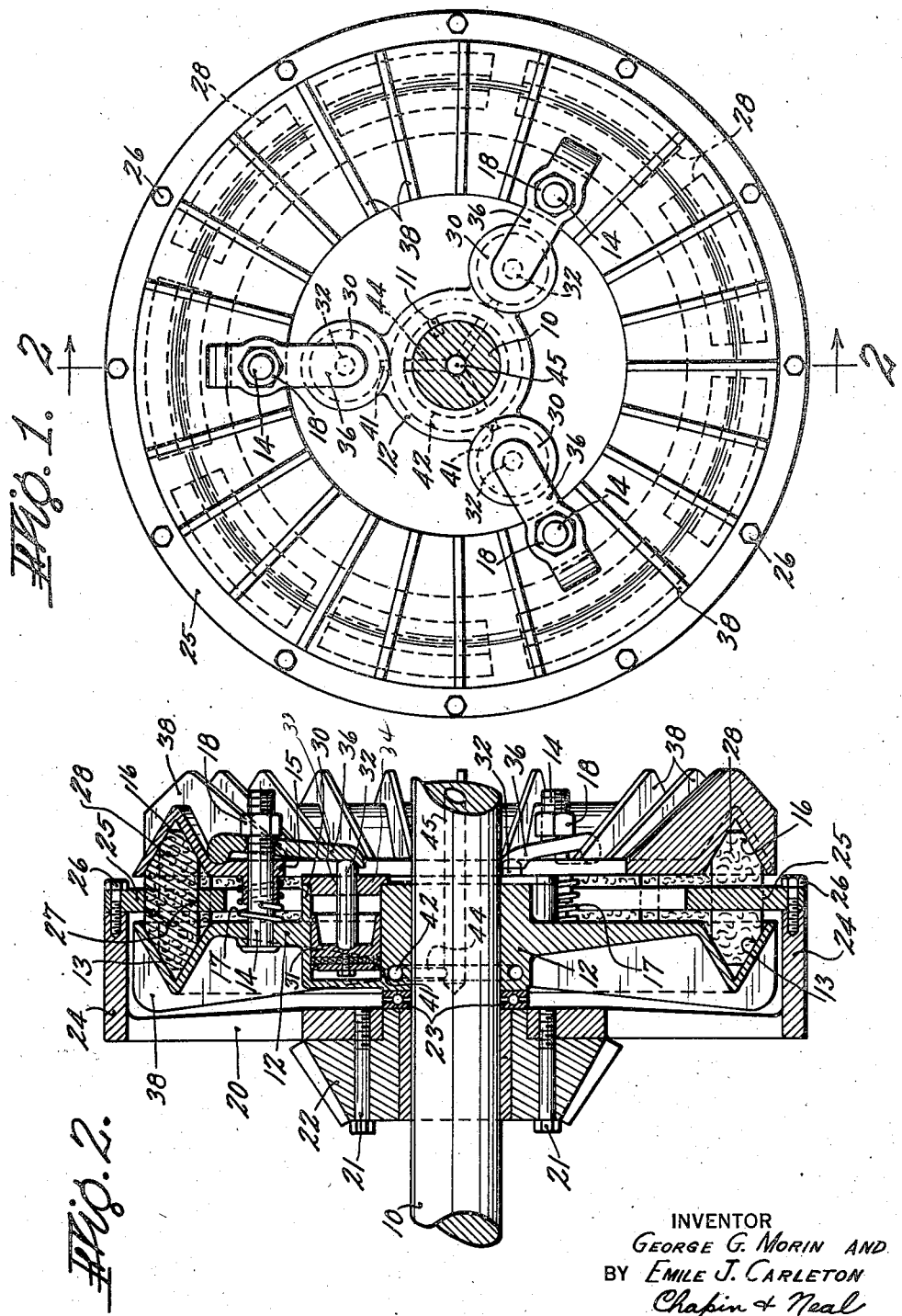
INVENTOR
GEORGE G. MORIN AND
BY EMILE J. CARLETON
Chapin & Neal
ATTORNEYS Patented Oct. 17, 1939

2,176,468

UNITED STATES PATENT OFFICE 2,176,468

CLUTCH MECHANISM

George G. Morin and Emile J. Carleton, Holyoke, Mass.

Application April 27, 1937, Serial No. 139,137

1 Claim. (Cl. 192—85)

This invention relates to a friction clutch operated by fluid pressure, and has as one object to provide a clutch of this character which is more uniform and positive in operation. A further object is to provide a simplified structure which is economical to manufacture and maintain. Other and further objects residing in the details of the construction will be apparent from the following specification and claim.

In the accompanying drawing which illustrates one embodiment of the invention,

Fig. 1 is a side elevational view, and

Fig. 2 is a sectional view substantially on line 2—2 of Fig. 1.

Referring to the drawing, 10 indicates a power-driven shaft to which is splined, as at 11, a wheel member 12. The outer edge of member 12 is formed with an annular recess 13, concentric with the shaft and V-shaped in cross section as shown in Fig. 2.

The wheel member 12 is provided inwardly of the recess 13 with a plurality of pins 14 upon which are slidably mounted an annular ring member 15. As best shown in Fig. 2, annular member 15 is formed with an annular recess 16, also V-shaped in cross section, and opposing recess 13. Member 15 is normally forced outwardly along pins 14 by springs 17 surrounding the pins between wheel member 12 and annular member 15. The outer ends of pins 14 are threaded to receive nuts 18 limiting the outward movement of the ring. Annular member 15 is adapted to be moved toward member 12 against the action of springs 17 by means later described and member 12 with the parts carried thereby constitute the driving member of the clutch. The driven member of the clutch includes a wheel or spider 20 which as shown is secured by machine bolts 21 to a bevel gear 22 freely rotatable on shaft 10 and separated from the hub portion of wheel 12 by thrust bearings 23. The outer periphery of member 20 is provided with a flange 24 extending over the periphery of member 12. The free edge of flange 24 is provided with flange 25, secured thereto as by bolts or screws 26, and extending radially inwardly between members 12 and 15. Flange 25 is provided with a plurality of openings 27 in which are mounted friction blocks 28, said blocks being transversely slidable in the openings 27. The ends of blocks 28 are inclined to correspond with the faces of the recesses 13 and 16.

The springs 17 tend to hold annular member 15 spaced from member 12 sufficiently to prevent frictional engagement of the blocks 28 in the recesses 13 and 16 so that rotation of shaft 10 and member 12 does not impart rotation to member 20.

Member 15 is adapted to be moved toward member 12, against the action of springs 17, to effect frictional engagement of the blocks 28 between said members and thereby drive member 20. The preferred means for doing this comprises a plurality of fluid pressure cylinders 30 formed in member 12 and opening toward the face of said member upon which annular member 15 is mounted. The cylinders are provided with pistons 31 provided with stems 32 which extend outwardly of the open ends of the cylinders and are guided by openings 33 formed in caps 34 fitted in the ends of the cylinders. The openings 33 may be made sufficiently larger than the stems 32 to vent the adjacent side of the pistons or a separate vent opening may be provided for the purpose.

Fluid pressure is admitted to or released from the closed end of cylinders 30 through ports 41 opening into an annular duct 42 formed in the hub of member 12 and connected by a passage 44 with a duct 45 extending longitudinally of shaft 10 and connected to any suitable source of fluid pressure not shown.

The cylinders 30 are equally spaced circumferentially around member 12 and each is in radial alignment with one of the pins 14. Pivotally mounted on each of the so aligned pins is a lever 36, one end of which engages the free end of the stem 32 of the piston in the adjacent cylinder while the other end bears on the outer face of annular member 15. The levers 36 are held on the pins 14 by the nuts 18 and are maintained in contact with the stems 32 and member 15 by the force of springs 17 which also tend to force the pistons toward the closed ends of the cylinders.

As will be obvious from Fig. 2, the admission of fluid pressure to the closed ends of the cylinders will drive the pistons 31 outwardly, thus causing stems 32 to pivot the levers 36 on pins 14 and force member 15 toward member 12 against the action of springs 17. The blocks 28 are thus frictionally engaged between the members 12 and 15 to cause member 20 to be driven with member 12 from the power shaft 10.

The slidable mounting of blocks 28 in flange 25 permits the blocks to adjust themselves between the members 12 and 15, assuring their proper frictional engagement with both of said members. This ability of the blocks to center themselves obviates any necessity of a fine initial adjustment of the relation of flange 25 with respect to members 12 and 15 and the proper centering of the blocks is automatically maintained during the wear of the blocks even though the blocks should tend to wear on one face faster than on the other.

Preferably the outer faces of members 12 and 15 are provided with fins 38 which help to radiate any heat generated in the clutch.

What we claim is:

In a friction clutch, a clutch member including a rigid wheel member provided adjacent its periphery with an annular V-shaped groove, pins rigidly secured to the wheel member, an annular member slidably mounted on said pins for axial movement toward and from the wheel member and provided on its inner face with a V-shaped groove opposing the V-shaped groove of the wheel, a second clutch member including a flange portion extending radially inwardly between said wheel and annular members and provided with transverse openings, friction members mounted in said openings and transversely slidable therein, said friction members being formed with wedge-shaped faces engageable in the V-shaped grooves of the wheel and annular members, springs surrounding said pins between the wheel and annular members and tending to separate the latter, a plurality of levers respectively pivotally and slidably mounted on said pins and arranged radially with respect to the wheel, said levers having their outer ends engaging the outer face of the annular member, a plurality of fluid pressure cylinders carried by the wheel, stemmed pistons operating in said cylinders, the stems of said pistons respectively engaging the inner ends of said levers, and means for simultaneously admitting fluid pressure to the cylinders to thereby move the annular member toward the wheel and effect a driving engagement of the friction members between the wheel and annular members.

GEORGE G. MORIN.
EMILE J. CARLETON.